United States Patent
Ali et al.

(10) Patent No.: US 10,743,140 B2
(45) Date of Patent: Aug. 11, 2020

(54) SMART LOCATION ALERT SYSTEM

(71) Applicant: International Business Machines Corporation, Armonk, NY (US)

(72) Inventors: Asmahan Ali, Highland, NY (US); Ali Y. Duale, Poughkeepsie, NY (US); Mustafa Mah, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 15/981,193

(22) Filed: May 16, 2018

(65) Prior Publication Data

US 2019/0357010 A1    Nov. 21, 2019

(51) Int. Cl.
| | |
|---|---|
| *H04M 11/04* | (2006.01) |
| *H04W 4/029* | (2018.01) |
| *H04W 4/12* | (2009.01) |
| *H04M 3/42* | (2006.01) |
| *G06F 16/29* | (2019.01) |

(52) U.S. Cl.
CPC .......... *H04W 4/029* (2018.02); *G06F 16/29* (2019.01); *H04M 3/42348* (2013.01); *H04W 4/12* (2013.01); *H04M 2242/04* (2013.01)

(58) Field of Classification Search
CPC ......... H04W 4/02; H04W 4/22; H04W 48/04; H04W 64/00; H04W 76/007
USPC ............. 455/404.1–404.2, 456.1–456.6, 457
See application file for complete search history.

(56) References Cited

U.S. PATENT DOCUMENTS

| | | | |
|---|---|---|---|
| 9,294,610 B2 | 3/2016 | Leonessi | |
| 9,576,460 B2 | 2/2017 | Dayal | |
| 2013/0197890 A1* | 8/2013 | Ide | G01C 21/3484 703/6 |
| 2015/0119070 A1* | 4/2015 | Harris | G01S 5/0205 455/456.1 |
| 2015/0127750 A1 | 5/2015 | Kumar | |
| 2016/0071148 A1 | 3/2016 | Joshi et al. | |
| 2016/0099895 A1 | 4/2016 | Crawford | |
| 2016/0379479 A1 | 12/2016 | Nepo | |
| 2018/0197624 A1* | 7/2018 | Robaina | A61B 3/0041 |
| 2018/0268346 A1* | 9/2018 | Cronin | G06Q 10/063116 |
| 2018/0331884 A1* | 11/2018 | Shaw | H04W 4/70 |

* cited by examiner

*Primary Examiner* — Matthew W Genack
(74) *Attorney, Agent, or Firm* — Stephen R. Yoder

(57) ABSTRACT

In an approach to sending an alert based on a user's location, one or more computer processors identify a position of a target device as a first location based, at least in part, on data provided by one or more geolocation systems; identify a location category for the first location; determine that the identified location category is among a predetermined set of location categories; identify a time threshold for the identified location category; identify an alert that is associated with the identified location category within the database; determine an amount of time that the target device is present at the first location; and determine that the amount of time the target device is present at the first location exceeds the time threshold, and in response, sending the alert to the one or more recipient devices for the purpose of notifying users of the first location of the target device.

15 Claims, 4 Drawing Sheets

SMART LOCATION ALERT SYSTEM

BACKGROUND

The present invention relates generally to the field of location alert systems and, more particularly, to alert systems utilizing a heterogeneous collection of location-determining systems.

Smart devices, such as smart phones, are prevalent in modern culture. There are over 2 billion smart device users in the world. Smart devices are ubiquitous in everyday life, where many individuals carry a personal smart device on their person, everywhere they go. Many smart devices are built with location monitoring and tracking capabilities. Smart devices, when on a network, continuously transmit data about the current time and position using built-in communication receivers.

One location monitoring system is global positioning system (GPS). With GPS, a GPS receiver monitors multiple satellites to determine the precise position of the receiver and its deviation over time. GPS utilizes the time and known position of specialized satellites. The satellites carry stable atomic clocks that are synchronized with one another and with the ground clocks. Any drift from true time maintained on the ground is corrected daily. Each GPS satellite continually broadcasts a signal to be received by a GPS receiver. At a minimum, four satellites must be in view of the receiver for it to compute four unknown quantities (three position coordinates and clock deviation from satellite time). These coordinates may be displayed on a moving map display or recorded and used by some other system.

Smart device tracking is the ascertaining of the position or location at a certain time of a smart device, whether stationary or moving. Localization occurs either via multilateration of radio signals between several cellular towers of the network and the phone, or via GPS. To locate a smart device using multilateration of radio signals, the smart device emits a roaming signal to contact the next nearby antenna tower. Examples of smart device tracking include network-based, handset-based, SIM-based, and/or wi-fi based.

SUMMARY

According to one embodiment of the present invention, a method for sending an alert based on a user's location is provided. The method includes: identifying a position of a target device as a first location based, at least in part, on data provided by one or more geolocation systems; identifying a location category for the first location, wherein a database associates the first location with the location category; determining that the identified location category is among a predetermined set of location categories, wherein the predetermined set of location categories is associated with the database; identifying a time threshold for the identified location category, wherein the database associates the time threshold with the identified location category; identifying an alert that is associated with the identified location category within the database; determining an amount of time that the target device is present at the first location, wherein the amount of time the target device is present at the first location is determined based, at least in part, on time information paired with geolocation information received from the one or more geolocation systems; and determining that the amount of time the target device is present at the first location exceeds the time threshold, and in response, sending the alert to the one or more recipient devices for the purpose of notifying users of the one or more recipient devices of the first location of the target device.

According to another embodiment of the present invention, a computer program product for sending an alert based on a user's location is provided. The computer program product comprises a computer readable storage medium and program instructions stored on the computer readable storage medium. The program instructions include: program instructions to identify a position of a target device as a first location based, at least in part, on data provided by one or more geolocation systems; program instructions to identify a location category for the first location, wherein a database associates the first location with the location category; program instructions to determine that the identified location category is among a predetermined set of location categories, wherein the predetermined set of location categories is associated with the database; program instructions to identify a time threshold for the identified location category, wherein the database associates the time threshold with the identified location category; program instructions to identify an alert that is associated with the identified location category within the database; program instructions to determine an amount of time that the target device is present at the first location, wherein the amount of time the target device is present at the first location is determined based, at least in part, on time information paired with geolocation information received from the one or more geolocation systems; and program instructions to determine that the amount of time the target device is present at the first location exceeds the time threshold, and in response, sending the alert to the one or more recipient devices for the purpose of notifying users of the one or more recipient devices of the first location of the target device.

According to another embodiment of the present invention, a computer system for sending an alert based on a user's location is provided. The computer system includes one or more computer processors, one or more computer readable storage media, and program instructions stored on the computer readable storage media for execution by at least one of the one or more processors. The program instructions include: program instructions to identify a position of a target device as a first location based, at least in part, on data provided by one or more geolocation systems; program instructions to identify a location category for the first location, wherein a database associates the first location with the location category; program instructions to determine that the identified location category is among a predetermined set of location categories, wherein the predetermined set of location categories is associated with the database; program instructions to identify a time threshold for the identified location category, wherein the database associates the time threshold with the identified location category; program instructions to identify an alert that is associated with the identified location category within the database; program instructions to determine an amount of time that the target device is present at the first location, wherein the amount of time the target device is present at the first location is determined based, at least in part, on time information paired with geolocation information received from the one or more geolocation systems; and program instructions to determine that the amount of time the target device is present at the first location exceeds the time threshold, and in response, sending the alert to the one or more recipient devices for the purpose of notifying users of the one or more recipient devices of the first location of the target device.

DETAILED DESCRIPTION

Figure 1:
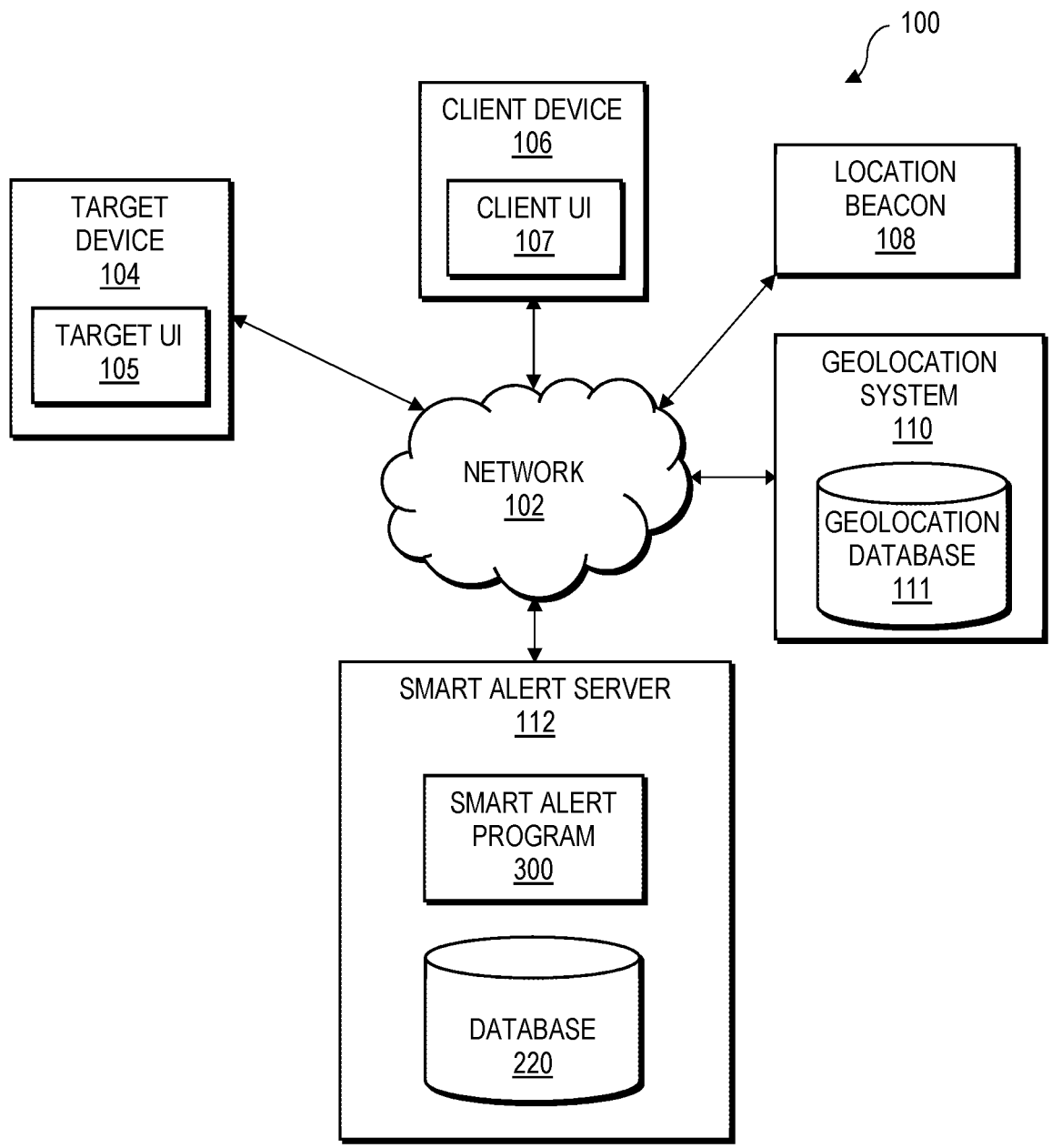
FIG. 1 is a functional block diagram illustrating a computing environment, in accordance with a first embodiment of the present invention.

Embodiments of the present invention recognize that in some situations, such as in an emergency or if a person simply forgets, interested parties are not contacted regarding the situation. Additionally, parents, spouses, family members, friends, employers, and other interested parties often want to know the status of someone who is traveling and would like to know if the person has safely arrived at their intended destination. Typically, the owner of a smart device contacts interested parties directly via a phone call or text message. Third parties, such as other individuals, hospitals, or the police, may also initiate contact with interested parties of a person if necessary. If, however, the owner of a smart device is in an emergency, the owner may find it difficult to contact interested parties to notify them of the emergency. An individual who is incapacitated from an unexpected medical emergency, for example, may not be able to notify his family members of the situation. Family members and other interested parties are notified of an emergency later on, if at all, which prevents them from acting promptly to assist or support the incapacitated individual.

Embodiments of the present invention provide a method to determine whether to send an alert to one or more listed recipients based on a user's location and activity. In some embodiments, for example, a user's smart device uses location monitoring and tracking capabilities to determine the location of the user and the time spent at the location. In such embodiments, the smart device communicates with geolocation systems and location sensors, such as GPS and wireless location beacons, to identify the location of the user. The smart device uses location and amount of time the user spends at the location in the determination of whether an alert is sent. Predefined locations are identified to prompt an alert if visited by the user and their smart device for a predefined amount of time. In various embodiments, the smart device or other device(s) that are provided with the location of the smart device can send an alert to the user's listed recipients. If, for example, a user is incapacitated from an injury, emergency services may transport the user to a hospital to receive medical attention. The user, incapacitated from injury, is unable to send an alert to his family members. In some embodiments, the user's smart device utilizes GPS services and location sensors placed within the hospital to determine that the user is in a hospital room. In this example, hospitals are on the predefined list or set of locations with a predefined time limit of one hour. The user's smart device determines if the user resides in the hospital room for longer than one hour, and if true, the user's smart device sends an alert message to the user's family members, who are on the user's recipient list. The alert message sent by the user's smart device is received by the recipient's device. In alternative embodiments, the smart device can determine whether to send an alert on the safe arrival to a destination. For example, a user is traveling and arrives at a desired location. The smart device determines that the user arrived at the desired destination and notifies the user's listed recipients that the user arrived with an alert. As illustrated by this example, among others, embodiments of the preset invention represent an improvement with respect to alert initiation at least in that the user does not need to take a specific action to initiate an alert. Rather than the user taking direct actions to initiate an alert to be sent to designated recipients, the alert is initiated outside of the user's direct control based on the location and/or movement(s) of the user and the user's smart device, as described herein.

Embodiments of the present invention will now be described in detail with reference to the Figures. It is to be understood that these embodiments are described only for the purpose of illustration and help those skilled in the art to understand and implement the present invention, without suggesting any limitation as to the scope of the invention. The invention described herein can be implemented in various manners other than the ones explicitly described herein.

FIG. 1 is a functional block diagram illustrating a computing environment, in accordance with an embodiment of the present invention. For example, FIG. 1 is a functional block diagram illustrating computing environment 100. Computing environment 100 includes target device 104, client device 106, location beacon 108, geolocation system 110, and smart alert server 112 connected over network 102. Target device 104 includes target user interface (target UI) 105. Client device 106 includes client user interface (client UI) 107. Geolocation system 110 includes geolocation database 111. Smart alert server 112 includes smart alert program 300 and database 220.

In various embodiments, smart alert server 112 is a computing device that can be a standalone device, a server, a laptop computer, a tablet computer, a netbook computer, a personal computer (PC), or a desktop computer. In another embodiment, smart alert server 112 represents a computing system utilizing clustered computers and components to act as a single pool of seamless resources. In general, smart alert server 112 can be any computing device or a combination of devices with access to some or all of target device 104, client device 106, location beacon 108, and geolocation system 110, and with access to and/or capable of executing smart alert program 300 and is capable of executing smart alert program 300. Smart alert server 112 may include internal and external hardware components, as depicted and described in further detail with respect to FIG. 4.

In this embodiment, smart alert program 300 is stored on smart alert server 112. In other embodiments, smart alert program 300 may reside on another computing device (e.g., target device 104), provided that it can access and/or receive data from some or all of target device 104, client device 106, location beacon 108, and geolocation system 110. In yet other embodiments, smart alert program 300 may be stored externally and accessed through a communication network, such as network 102.

Network 102 can be, for example, a local area network (LAN), a wide area network (WAN) such as the Internet, or a combination of the two, and may include wired, wireless, fiber optic or any other connection known in the art. In general, network 102 can be any combination of connections and protocols that will support communications between smart alert server 112, target device 104, client device 106, location beacon 108, and geolocation system 110, in accordance with a desired embodiment of the present invention.

In general, smart alert program 300 operates to determine whether an alert is to be sent to a list of recipients, based on a user's location and time present at the location. One or more users of smart alert program 300 uses a smart device, such as target device 104 and/or client device 106, to collect a list of recipients. In various embodiments, the recipients are the individuals or entities who may receive alerts about the user. Smart alert program 300 identifies the location of the user, as described in greater detail herein with respect to determining the location of target device 104. The location of the user is needed in the determination of whether an alert needs to be sent. If a user is located at certain areas, an alert may be necessary. Smart alert program 300 utilizes data provided by geolocation positioning systems and/or location beacons and/or target device 104 to determine the location of the user. Smart alert program 300 identifies the category of the location (i.e., a location category). Location categories are enumerated to smart alert program 300 as types of locations where an alert may be necessary. Smart alert program 300 determines whether the location category is relevant. Smart alert program 300 can, for example, determine location category relevancy based on pattern recognition and/or information collected from a database. If the location category is relevant, smart alert program 300 determines the threshold amount of time relevant to a location category. In various embodiments, smart alert program 300 determines threshold amount of time relevant to the location category based on pattern recognition and/or information collected from a database. Smart alert program 300 determines whether the user is present at the location longer than the determined threshold amount of time relevant to the location category. If the user is present for longer than the threshold amount of time relevant to the location category, smart alert program 300 sends an alert and information regarding the alert to the user's list of recipients (e.g., client device 106).

Database 220 is a data repository that may be written to and read by smart alert program 300. List(s) of recipients, location history, location activity, and location information may be stored to database 220. The location history is the history of movement (i.e., a sequence of locations and corresponding point in time) by the target device (e.g., target device 104). In some embodiments, database 220 may be written to and read by programs and entities outside of computing environment 100, as well as other entities within computing environment 100, in order to populate the repository with list of recipients, location history, location activity, and location information. Database 220 may also include information stored on geolocation database 111, such as location coordinates, location identification, and geocoding information.

In various embodiments, target device 104 is a computing device that can be a standalone device, a server, a laptop computer, a tablet computer, a netbook computer, a personal computer (PC), a desktop computer, a personal digital assistant (PDA), a smart phone, or any programmable electronic device capable of communicating with smart alert server 112 via network 102. In another embodiment, target device 104 represents a computing system utilizing clustered computers and components to act as a single pool of seamless resources. In general, target device 104 can be any computing device or a combination of devices with access to smart alert server 112, and with access to and/or capable of executing smart alert program 300. In some embodiments, target device 104 can communicate directly or indirectly with client device 106. Target device 104 may include internal and external hardware components, as depicted and described in further detail with respect to FIG. 4.

Target device 104 includes a user interface (UI), target UI 105, which executes locally on target device 104 and operates to provide a UI to a user of target device 104. Target UI 105 further operates to receive user input from a user via the provided user interface, thereby enabling the user to interact with target device 104. In one embodiment, target UI 105 provides a user interface that enables a user of target device 104 to interact with smart alert program 300 of smart alert server 112 via network 102. In various examples, the user interacts with smart alert program 300 in order to submit list(s) of recipients, view alerts, view location history, and view location activity. In one embodiment, target UI 105 is stored on target device 104. In other embodiments, target UI 105 is stored on another computing device (e.g., smart alert server 112), provided that target UI 105 can access and is accessible by target device 104 and smart alert program 300.

Client device 106 is a computing device that can be a standalone device, a server, a laptop computer, a tablet computer, a netbook computer, a personal computer (PC), a desktop computer, a personal digital assistant (PDA), a smart phone, or any programmable electronic device capable of communicating with smart alert server 112 via network 102. In another embodiment, client device 106 represents a computing system utilizing clustered computers and components to act as a single pool of seamless resources. In general, client device 106 can be any computing device or a combination of devices with access to smart alert server 112, and with access to and/or capable of executing smart alert program 300. In one embodiment, a plurality of client devices exists, where each client device belongs to a potential recipient of an alert sent by smart alert program 300. Client device 106 may also be referred to as a recipient device, a device used by a recipient of an alert sent from smart alert program 300. Client device 106 may include internal and external hardware components, as depicted and described in further detail with respect to FIG. 4.

Client device 106 includes a user interface (UI), client UI 107, which executes locally on client device 106 and operates to provide a UI to a user of client device 106. Client UI 107 further operates to receive interaction from a user via the provided user interface, thereby enabling the user to interact with client device 106. In one embodiment, client UI 107 provides a user interface that enables a user of client device 106 to interact with smart alert program 300 of smart alert server 112 via network 102. In one embodiment, client UI 107 is stored on client device 106. In other embodiments, client UI 107 is stored on another computing device (e.g., smart alert server 112), provided that client UI 107 can access and is accessible by at least client device 106 and smart alert program 300.

Location beacon 108 is a functional device that can emit signals that are detectable by a computing device, such as a standalone device, a server, a laptop computer, a tablet computer, a netbook computer, a personal computer (PC), a desktop computer, a personal digital assistant (PDA), a smart phone, or any programmable electronic device. In some embodiments, location beacon 108 is capable of communicating with smart alert server 112 via network 102. In some embodiments, location beacon 108 can communicate over network 102 with wireless local area network (WLAN) communication, near-field communication (NFC), radio-frequency identification (RFID), and/or Bluetooth communication. In general, location beacon 108 can be any device or a combination of devices designed to send and/or receive signals from a computing device with access to smart alert server 112 and with access to and/or capable of executing smart alert program 300.

In general, geolocation system 110 is a system with capabilities to conduct identification or estimation of the real-world geographic location of an object, such as a computing device. Geolocation involves the generation of a set of geographic coordinates and is closely related to the use of positioning systems. In various embodiments, device geolocation can be performed by associating a geographic location with an Internet Protocol (IP) address, a MAC address, RFID tag, a hardware embedded article/production number, an embedded software number, an invoice, a Wi-Fi positioning system, a device fingerprint, canvas fingerprinting, device GPS coordinates, or user-inputted information. Data gathered from device geolocation can include information such as country, region, city, postal/zip code, latitude, longitude, and time zone. Deeper data sets can determine other parameters such as domain name, connection speed, ISP, language, proxies, company name, US DMA/MSA, NAICS codes, and home/business. Mobile phone localization, from either multilateration of radio signals between cell towers or by GPS, can also pair a device to a location and a time. The location may be signified as broadly as a zip code or as narrowly as specific longitude/latitude coordinates.

Geolocation system 110 may be a global navigation satellite system that provides geolocation and time information to a GPS receiver anywhere on or near the Earth where there is an unobstructed line of sight to four or more GPS satellites. Geolocation involves the generation of a set of geographic coordinates and is closely related to the use of positioning systems. Device geolocation is performed by associating a geographic location with the GPS coordinates of target device 104. Geolocation system 110 can transmit signals to target device 104 and/or receive signals from target device 104 enabling at least one of, or a combination of, (i) target device 104 determining its position based on signal(s) received from geolocation system 110 and (ii) geolocation system 110 determining the location of target device 104 based on signal(s) received from target device 104. In embodiments utilizing GPS, for example, target device 104 transmits and receives signals to and from global navigational satellite systems. In other embodiments utilizing cellular towers, for example, target device 104 transmits and receives radio signals between several cellular towers for multilateration. Data provided by geolocation system 100 may be provided by GPS, one or more location beacons, optical character recognition computer program instructions, and natural language processing computer program instructions. In some embodiments, data provided by geolocation system 100 may be provided by location beacons that is able to emit a signal identifying a location. In other embodiments, data provided by geolocation system 100 may be provided by an optical head-mounted display device executing optical character recognition computer program instructions to recognize text found in the location and executing natural language processing computer program instructions to identify the location.

Geolocation database 111 is a data repository that may be written to and read by geolocation system 110. Location, location identification, and geocoding information may be stored to database 220. In some embodiments, geolocation database 111 may be written to and read by programs and entities outside of computing environment 100, as well as other entities within computing environment 100, in order to populate the repository with location, location identification, and geocoding information.

Figure 2:
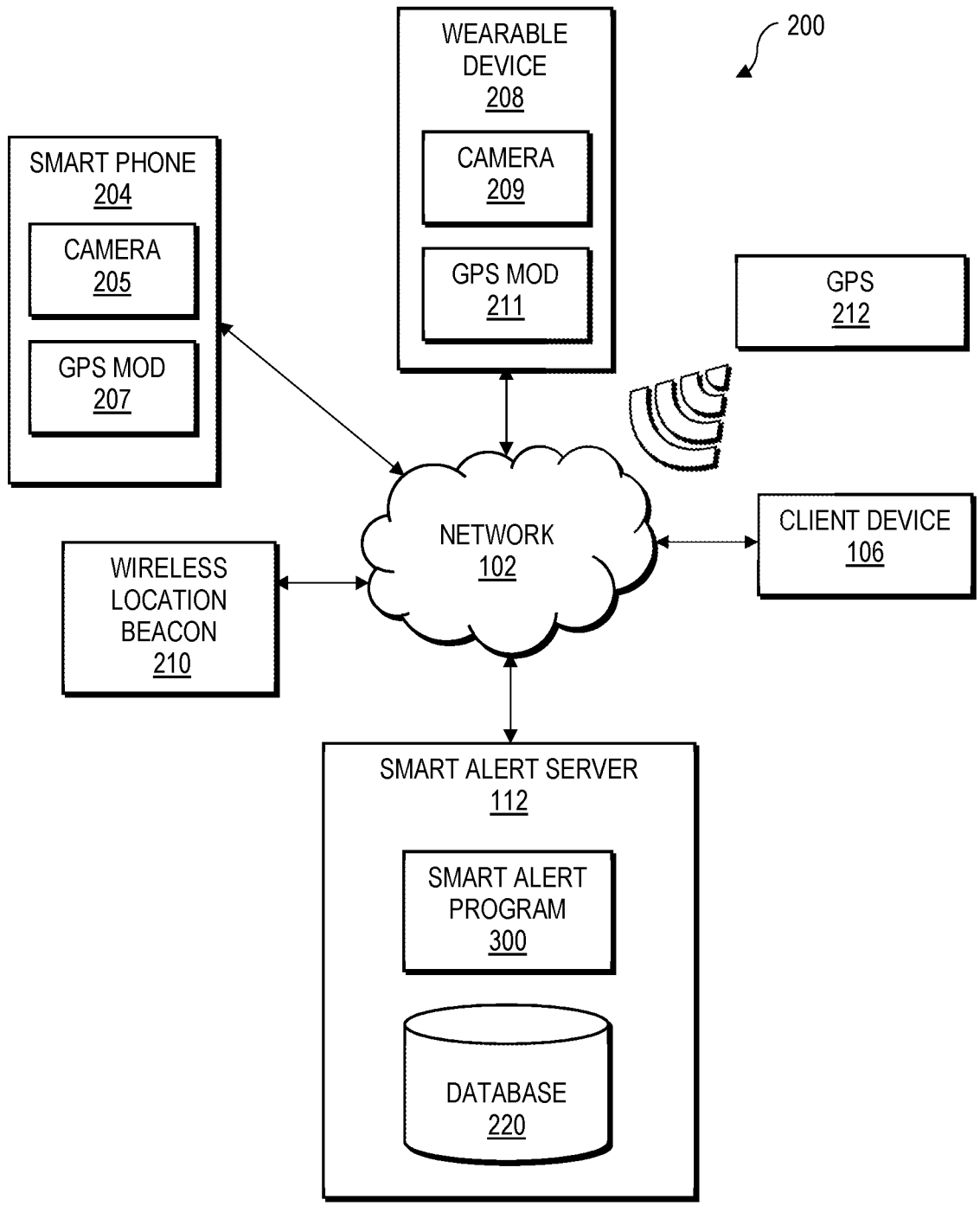
FIG. 2 is a functional block diagram illustrating a computing environment, in accordance with a second embodiment of the present invention.

FIG. 2 is a functional block diagram illustrating a computing environment, in accordance with an embodiment of the present invention. For example, FIG. 2 is a functional block diagram illustrating computing environment 200. Computing environment 200 includes smart phone 204, wearable device 208, wireless location beacon 210, GPS 212, client device 106, and smart alert server 112 connected over network 102. Smart phone 204 includes camera 205 and GPS mod 207 (i.e., a GPS module). Wearable device 208 includes camera 209 and GPS mod 211.

In the specific embodiment depicted in FIG. 2, target device 104 is represented by smart phone 204 and/or wearable device 208. As described above with respect to target device 104, smart phone 204 operates as a handheld personal device with a mobile operating system and an integrated mobile broadband cellular network connection for voice, SMS, Internet data, and Wi-Fi communication, capable of communicating with smart alert server 112 via network 102 and with access to and/or capable of executing smart alert program 300. Smart phone 204 may include internal and external hardware components, as depicted, and described in further detail with respect to FIG. 4. In various examples, a user of smart phone 204 interacts with smart alert program 300 in order to submit list(s) of recipients, view alerts, view location history, view location activity, and determine location via optical environment recognition.

Wearable device 208 is an optical head-mounted display device capable of communicating with smart alert server 112 via network 102 and with access to and/or capable of executing smart alert program 300. Wearable device 208 may include internal and external hardware components, as depicted, and described in further detail with respect to FIG. 4. In various examples, a user of wearable device 208 interacts, directly or indirectly, with smart alert program 300 in order to submit list of recipients, view alerts, view location history, view location activity, and determine location via optical environment recognition. Wearable device 208 may be completely functional as standalone smart device or function as an extension of a smart phone (e.g., smart phone 204), connected and running software that enables the two devices to be synchronized for additional and enhanced functionality. Wearable device 208 includes camera 209 for optical environment recognition capabilities based on what a user looks toward while wearing the device.

Optical character recognition techniques may be used to convert images taken of typed, handwritten, or printed text into machine-encoded text. Machine-encoded text is comprehensible by a machine to use for processing. Optical character recognition techniques include recognizing characters in their entirety or by detecting the individual lines and strokes of characters. The wearable device worn by a user recognizes text displayed on documents, signs, billboards, or other printed or displayed materials. Optical character recognition utilizes various techniques to recognize text from other objects. Wearable device 208 utilizes natural language processing to transcribe recognized text into a machine comprehensible format. Natural language processing techniques enable computer to understand human (natural) language. Parsing, for example, is a natural language process of analyzing a string of characters with the rules of formal grammar. The machine comprehensible text parsed from displayed or printed recognizable text are compared with definitions and/or logic enumerated by database 220 to determine the meaning of the transcribed text.

Optical character recognition techniques in combination with natural language processing is used by wearable device 208 to understand the meaning of text displayed in the environment around wearable device 208 to, in such embodiments, infer various forms of information about the environment and/or the location of wearable device 208, as described herein.

Smart phone 204 and wearable device 208 include camera 205 and camera 209, respectively, wherein each is able to capture photographs and/or record video using one or more built-in digital cameras. Smart phone 204 and wearable device 208 may run mobile applications along with camera 205 and camera 209 to add capabilities such as geotagging and optical environment recognition.

Smart phone 204 and wearable device 208 includes GPS mod 207 and GPS mod 211, respectively, which are GPS receiver modules that can receive information from GPS satellites and calculate the device's geographical position. GPS mod 207 and GPS mod 211 receive data from GPS 212 to utilize GPS capabilities such as device tracking and location identification.

Wireless location beacon 210 is a functional device that can emit signals that are detectable by a computing device, such as smart phone 204 and/or wearable device 208, and capable of communicating with smart alert server 112 via network 102. In some embodiments, wireless location beacon 210 can communicate over network 102 with wireless local area network (WLAN) communication, near-field communication (NFC), radio-frequency identification (RFID), and/or Bluetooth communication. Wireless location beacon 210 can be located in a room within a building so that when a user enters the room, wireless location beacon 210 may communicate with smart phone 204 and/or wearable device 208 to identify itself to smart phone 204 and/or wearable device 208 and/or identify the room and/or location of wireless beacon 210 to smart phone 204 and/or wearable device 208. For example, a user holding a smart phone enters a room with a wireless location beacon inside. The wireless location beacon is designated as the wireless location beacon for that specific room. When the user enters the room, the wireless location beacon connects with the smart phone with Bluetooth communication to identify itself and to identify the room the smart phone is in. A wireless location beacon can be used to refine the location area determined by geolocation systems (e.g., GPS 212) to a subset of the locations in that location area. For example, a geolocation system determines smart phone 204 is located in a building which contains multiple rooms. Wireless location beacon 210 can assist in refining the location of smart phone 204 to the specific room that smart phone 204 is located in. The specific room is a subset of the overall location of the building.

In the specific embodiment depicted in FIG. 2, geolocation system 110 is represented by GPS 212. As described above with respect to geolocation system 110, GPS 212 operates to provide geolocation and time information to a GPS receiver anywhere on or near the Earth where there is an unobstructed line of sight to four or more GPS satellites. Device geolocation is performed by associating a geographic location with the GPS coordinates of smart phone 204 and/or wearable device 208. GPS 212 contains a data repository that may be written to and read by GPS 212 and stores location, location identification, and geocoding information.

To illustrate the functionality described above with respect to FIG. 2, in one specific example a user of smart phone 204, Abel, stores the names and contact information of five close family members and friends in database 220 of smart alert server 112 via smart phone 204. Abel inputs the phone numbers of each of the five individuals. If an alert is sent out by smart alert program 300, one or more of the five individuals would receive a text message with the alert. The five designated recipients use client devices (also called recipient devices), such as client device 106, to receive alerts. In various embodiments, database 220 associates listed individuals with specific alerts such that one or more recipients may be designated to receive some alerts but not all alerts sent via smart alert program 300.

As Abel walks around a city block, smart phone 204 constantly monitors the location of Abel. When Abel walks into a grocery store, GPS mod 207 on smart phone 204 interacts with GPS 212 to determine Abel is in a grocery store. GPS mod 207 on smart phone 204 receives information from GPS satellites and calculates the geographical coordinates of smart phone 204. GPS 212 reads the geographical coordinates and determines via its data repository that Abel is located in a specific grocery store. If Abel suffers a medical injury and is transported to a hospital to receive medical attention, GPS mod 207 on smart phone 204 interacts with GPS 212 to determine that Abel has left the grocery store. GPS mod 207 on smart phone 204 constantly receives information from GPS satellites and calculates the geographical coordinates of smart phone 204 as Abel is transported. GPS 212 determines the geographical coordinates and determines via its data repository that Abel is now located at a hospital. Location beacons, such as wireless location beacon 210, within the hospital building may additionally refine the determination of Abel's location within the building to a subset of the locations consisted in Abel's location. Location beacons are advantageous in that they may enable smart phone 204 and/or any other target device 104 to determine the exact room a user resides in, whereas GPS may have difficulty making that determination, due to signal attenuation from roofs, walls, and other objects. Attenuation is the reduction of signal strength during transmission. While GPS provides the geographical coordinates of smart phone 204, location determination within a building may be difficult to determine due to factors such as bad signal strength. Additionally, if a building has multiple floors, location determination via GPS may not be adequate since GPS is an overhead satellite-based positioning system. For example, differentiating a device located in a basement versus a device located in the first floor may be difficult. Location beacons provide additional support to the determination of a smart phone's location within a building. Referring again to the example involving Abel, smart phone 204 interacts with wireless location beacon 210 located in a medical treatment patient room. Smart alert program 300 determines Abel is in a medical treatment patient room from location information received from wireless location beacon 210.

In addition to determining Abel's location, smart alert program 300 determines a corresponding location category and whether or not Abel's location and/or location category is relevant to one or more alerts. In the above example, when Abel is brought to ABC Medical Center to receive medical attention, smart alert program 300 identifies the location category to be "hospital". If, for example, Abel visits the lobby of ABC Medical Center to ask a question, smart alert program 300 determines Abel is in the ABC Medical Center lobby and smart alert program 300 determines the location category to be "hospital lobby" and/or "lobby." When Abel is brought to ABC Medical Center to receive medical treatment, smart alert program 300 determines Abel is in a medical treatment patient room of ABC Medical Center and smart alert program 300 determines the location category to be "hospital patient room" or "patient room."

When "hospital lobby" is not input as a relevant location category into smart alert program 300, if Abel visits the lobby of ABC Medical Center to ask a question, smart alert program 300 determines that "hospital lobby" or "lobby" is not a relevant location category. "Patient room," however, may be input as a relevant location category to smart alert program 300 such that, when Abel is brought to a medical treatment patient room of ABC Medical Center to receive medical treatment, smart alert program 300 determines that Abel is in a relevant "hospital patient room" or "patient room" location category.

In some embodiments, like the one depicted in FIG. 2, an optical head-mounted display device, such as wearable device 208, is used as a target device (i.e., an instance of target device 104) with smart alert program 300. Camera 209 on wearable device 208 is used for optical environment recognition capabilities based on what a user looks toward while wearing the device. In some cases, it is advantageous to use optical character recognition capabilities and natural language processing capabilities along with GPS capabilities to identify locations when specific coordinates and/or location category information for the location are not stored in database 220. As explained above, optical character recognition is the electronic conversion of images of typed, handwritten or printed text into machine-encoded text. Optical character recognition may be used by recognizing characters in their entirety (pattern recognition) or by detecting the individual lines and strokes characters are made from (feature detection) and identifying them that way. As also explained above, natural language processing is how computers process and understand human (natural) language. Parsing is a natural language process of analyzing a string of characters with the rules of formal grammar. For example, if user Abel is located within ABC Medical Center and GPS 212 determines Abel is located at a particular set of coordinates. The coordinates, however, may not be associated with ABC Medical Center in database 220. In such cases the use of optical character recognition and natural language processing may advantageously facilitate the determination of the appropriate location category. If, for example, Abel is looking at a sign that reads "ABC Medical Center" while wearing wearable device 208, optical character recognition software within wearable device 208 determines Abel is looking at text. Natural language processing parses the text "ABC Medical Center" to distinguish the different words and comprehend the definitions of the words of "ABC Medical Center". Smart alert program 300 compares the machine comprehensible text parsed from text with definitions enumerated by database 220 to determine the meaning of the transcribed text. Smart alert program 300 is thereby capable of determining that Abel is located at ABC Medical Center and determine that the corresponding location category is "medical center" or "hospital" or any other appropriate location category enumerated within database 220 from the natural language processing of the text reading "ABC Medical Center." Additionally, such techniques may enable smart alert program 300 to determine the location of wearable device 208 by cross-referencing "ABC medical center" with associated location information (e.g., GPS coordinates) within database 220 and/or geolocation database 111.

In some embodiments, optical character recognition capabilities can also be used alone or along with GPS capabilities to determine location categories for location categories not stored in database 220. For example, if user Abel is wearing wearable device 208, and GPS 212 determines Abel is located at ABC Medical Center. The location category of ABC Medical Center may not be stored in a database for smart alert program 300 to access or location determination systems may not be accurate enough to determine location. Abel is looking at a sign that reads "ABC Medical Center" while wearing wearable device 208. Optical character recognition software within wearable device 208 determines Abel is looking at text that reads "ABC Medical Center" and smart alert program 300 determines Abel's location, ABC Medical Center, is a hospital. In this example, optical recognition techniques recognize the words "Medical Center" and uses information within databases to determine that "Medical Center" refers to a hospital.

In another example, Abel walks to a hospital lobby to ask a question and on his way to the hospital lobby, he passes through hospital patient room DEF. As previously described, in some embodiments time spent at a location is a factor that smart alert program 300 considers when determining whether or not to send an alert. In this example, smart alert program 300 determines Abel is only present in hospital patient room DEF for a few minutes and that the relevant threshold amount of time for location category "hospital patient room" or "patient room" is one hour. Smart alert program 300 determines that Abel is not present at hospital patient room DEF for longer than the threshold amount of time relevant for a hospital patient room and does not send an alert.

Alternatively, Abel is brought to a medical treatment patient room of ABC Medical Center to receive medical treatment. Abel resides in the medical treatment patient room for more than one hour. The relevant threshold amount of time for a hospital patient room is one hour. Smart alert program 300 determines that Abel is present at a hospital patient room for longer than one hour. Smart alert program 300 sends an alert and relevant information in the form of a text message to the five individuals Abel listed as recipients. The alert contains Abel's name, his location at a hospital patient room in ABC Medical Center, information on where ABC Medical Center is located, and that Abel has been in the hospital patient room in ABC Medical Center for longer than one hour.

Figure 3:
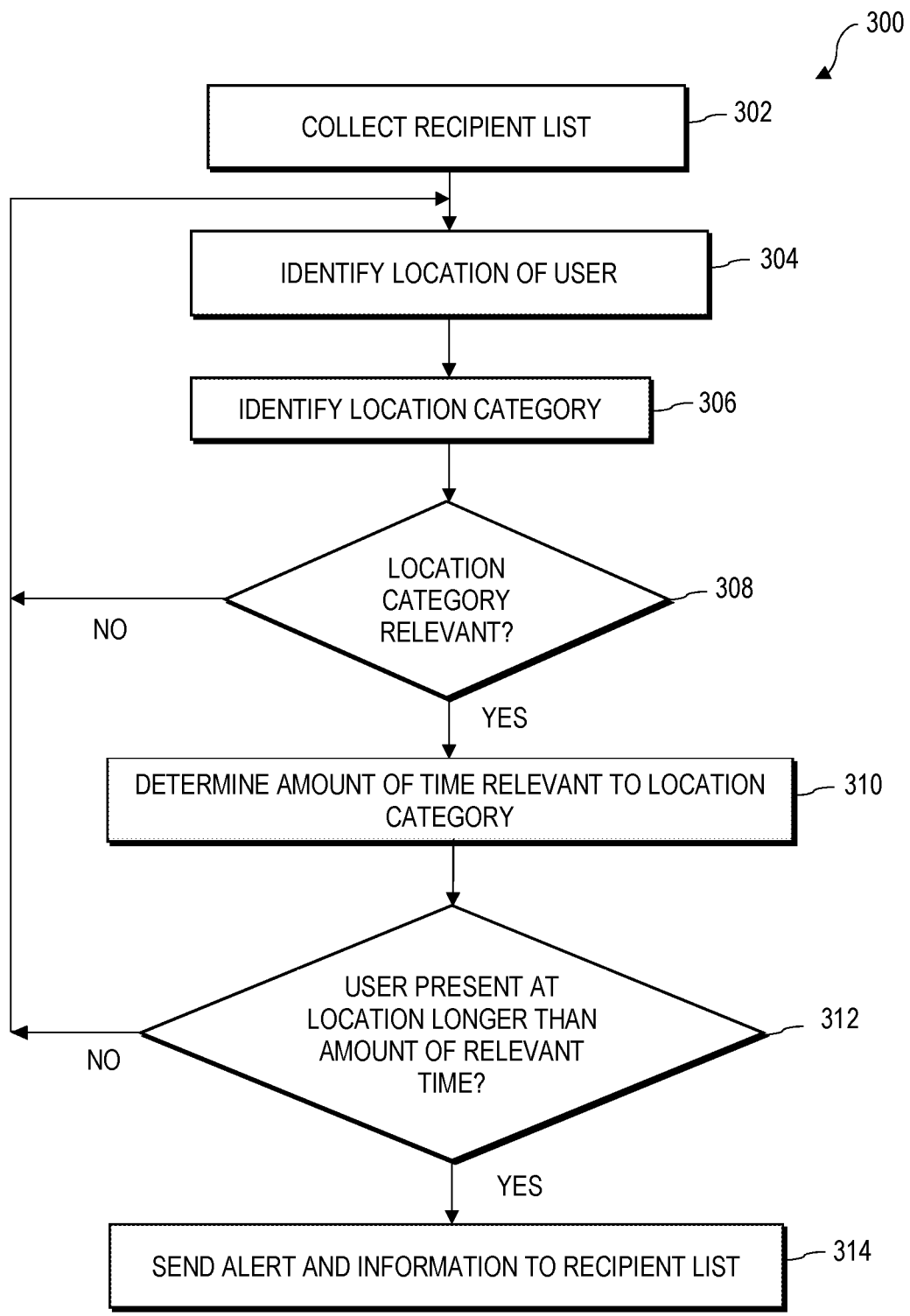
FIG. 3 is a flowchart depicting operations for sending an alert based on a user's location, on a computing device within the computing environment of FIG. 1, in accordance with an embodiment of the present invention.

FIG. 3 is a flowchart depicting operations for sending an alert based on a user's location, on a computing device within the computing environment of FIG. 1 and/or FIG. 2, in accordance with an embodiment of the present invention. For example, FIG. 3 is a flowchart depicting operations of smart alert program 300 on smart alert server 112 within computing environment 100 and/or computing environment 200. In other examples, FIG. 3 is a flowchart depicting operations of smart alert program 300 on target device 104 (e.g., smart phone 204 and/or wearable device 208) within computing environment 100 and/or computing environment 200.

Smart alert program 300 collects a user's list of recipients and stores the list in a database (step 302, e.g., database 220). In an embodiment of the present invention, a user generates the list of recipients by inputting contact information of interested parties that the user would like to receive alerts from smart alert program 300 (e.g., user(s) of client device 106). The user can input the contact information into target device 104 of FIG. 1 via target UI 105. The contact information can include phone numbers for phone calls and text messages, and email addresses. In some embodiments, the list of recipients and corresponding contact information may be accessed by the user and the user may edit the given information. For example, a user of smart alert program 300 uses smart phone 204 of FIG. 2 to input the names and the contact information of interested parties. Interested parties may be any individual or entity whom the user would like to have receive alerts from smart alert program 300. The list of recipients and contact information are stored on database 220. In another embodiment, the contact information of interested parties is collected directly from a third-party source, such as a school's parent or guardian directory, an employer's emergency contact information database, or a hospital's emergency contact information database.

Smart alert program 300 identifies the location of the user (step 304). In an embodiment of the present invention, smart alert program 300 determines the location of the smart device, such as target device 104, that the user carries on the user's person. In an embodiment, smart alert program 300 utilizes positioning systems, such as geolocation system 110 of FIG. 1, to generate a set of geographic coordinates. Smart alert program 300 accesses geolocation database 111 to determine the location corresponding to the geographic coordinates of target device 104. For example, GPS mod 207 of FIG. 2, located on smart phone 204, which belongs to a user and receives signals from GPS 212 to determine the coordinates of smart phone 204. Based on these coordinates, GPS mod 207 may access geolocation information within geolocation databases (e.g., geolocation database 111) to determine the corresponding location for the geographic coordinates of smart phone 204. In another embodiment, smart alert program 300 utilizes a location device that can emit detectable signals, such as location beacon 108, to determine the location of the user. For example, when a user, carrying smart phone 204, enters a room that contains wireless location beacon 210, wireless communication beacon 210 communicates the location of the room and information of the room's location to smart phone 204. Smart alert program 300 identifies the location of the room from the information obtained from wireless beacon 210. In yet another embodiment, smart alert program 300 utilizes both geolocation systems and location beacons to determine the location of a smart device. For example, a user, carrying smart phone 204, enters an office building. Smart alert program 300 utilizes geolocation systems to determine the user is located in the office building. Each room of the office building contains a location beacon. As the user travels within the office building, smart alert program 300 utilizes the location beacons within rooms of the office building to determine the user's location with respect to what room the user is located within the office building.

Smart alert program 300 identifies the category of the location (step 306). In an embodiment of the present invention, smart alert program 300 determines the location category of an identified location. A location category is a descriptor term for a specific location and acts as an identifier for the type of location that corresponds to the specific location. Accordingly, a plurality of specific locations can be associated with each respective location category. Examples of location categories include hospital, grocery store, school, police station, residential home, and restaurant. In the example described above with respect to FIG. 2, the location category for ABC Medical Center is hospital. Location categories corresponding to specific locations are stored on database 220 of FIG. 1 and may be retrieved by smart alert program 300. For example, when user Abel walks into ABC Foods, smart alert program 300 identifies the location category to be "grocery store". In another embodiment, location categories include categories of rooms within buildings. Location categories of rooms describe unique or specific information about the room within a building. Referring again to the example involving Abel, ABC Medical Center's hospital rooms each have specific location categories. Examples of location categories for rooms in ABC Medical Center include: lobby, examination room, operating room, intensive care center, and morgue.

Having identified the category of the location, smart alert program 300 determines whether the location category is relevant (decision step 308). In various embodiments, a relevant location category is a location category enumerated within a database and/or determined via pattern recognition techniques. For example, a relevant location category can be a location category that is one of a predetermined set of location categories (either explicitly or inferentially) in which the set represents, at least in part, anticipated locations/movements that are associated with the user of target device 104 (e.g., smart phone 204 and/or wearable device 208). For example, relevant location categories may include hospitals and police stations. In another embodiment, relevant location categories are locations that, with a high probability of likelihood, the user will visit, as enumerated within a database or determined via pattern recognition techniques, as discussed in more detail in the subsequent paragraph. Pattern recognition techniques may be used to determine relevant location categories to better tailor location category relevancy with respect to a user's likely or anticipated travel destinations, and is some embodiments, corresponding points in time. For example, if a student regularly travels to school, schools may be considered a relevant location category. In an embodiment, relevant location categories may be inputted to smart alert program 300 with a device, such as target device 104 and/or client device 106 of FIG. 1. For example, a user or designated recipient who knows a specific travel path the user may take, can input to smart alert program 300 the destinations the user will be travelling to and/or locations along the specific travel path. The location categories of the locations inputted to smart alert program 300 may be determined as relevant location categories.

In another embodiment, smart alert program 300 determines, as part of step 308, relevant location categories by detecting patterns of travel of users, with emphasis on locations commonly visited (i.e., the movement history of the user with respect to locations and time and/or locations only visited in emergency situations). Emergency situations can be situations that require police, fire, and/or medical assistance. Smart alert program 300 detects patterns via machine learning and pattern recognition techniques, as would be appreciated by one with skill in the art. Machine learning explores the study and construction of algorithms that can learn from and make predictions based on data. Such algorithms operate by building a model from example inputs in order to make data-driven predictions or decisions expressed as outputs, rather than following strictly static program instructions. Within the field of data analytics, machine learning is a method used to devise complex models and algorithms that lend themselves to decisions, and probability related prediction. These analytical models enable researchers, data scientists, engineers, and analysts to produce reliable, repeatable decisions and results and to uncover hidden insights through learning from historical relationships and trends in the data. Pattern recognition is a branch of machine learning that focuses on the recognition of patterns and regularities in data. Pattern recognition systems may be trained from labeled "training" data (supervised learning), but when no labeled data are available, other algorithms can be used to discover previously unknown patterns (unsupervised learning). Location histories, like movement histories (e.g., sequences of locations and a corresponding sequence of points in time), of various users may represent training data for supervised learning. From location histories, pattern recognition systems may determine commonly visited locations to classify as relevant location categories and the threshold amount of time relevant to the locations. In some embodiments, smart alert program 300 may use machine learning and pattern recognition techniques to identify the locations that are regularly visited by a user of target device 104 while also utilizing a list of enumerated, relevant locations and/or location categories to determine whether or not to send an alert, as described herein.

For the case in which smart alert program 300 determines the location category is not relevant (step 308, "NO" branch), smart alert program 300 returns to step 304 to identify the location of the user. In this case, smart alert program 300 proceeds to identify the location of user at a later time (i.e., a subsequent iteration of step 304). For the case in which smart alert program 300 determines that the location category is relevant (step 308, "YES" branch), smart alert program 300 proceeds to determine the threshold amount of time relevant to the location category (step 310), if any. In an embodiment, the threshold amount of time relevant to a location category is the amount of time enumerated within a database and/or determined via pattern recognition techniques. In some cases, the threshold amount of time may be identified based, at least in part, on a time of day associated with the identified location of the user (i.e., a plurality of threshold amounts of time may exist for a location and/or a location category, wherein each threshold amount of time is associated with a specific time of day and/or span of times of day). For example, spending over an hour at a police station can be considered a threshold amount of time relevant to the location category of "police station". In another embodiment, the threshold amount of time relevant to a location category is an amount of time spent at a relevant location category as enumerated within a database or determined via pattern recognition techniques. For example, spending over an hour at a school can be considered a threshold amount of time relevant to the location category of "school". In an embodiment, the threshold amounts of time relevant to location categories are inputted to smart alert program 300 with a device, such as target device 104 of FIG. 1. In another embodiment, smart alert program 300 determines the threshold amounts of time relevant to a location category by detecting patterns of travel of users, with emphasis on the amounts of time spent and/or time of day spent at certain locations. Pattern recognition techniques may be used to determine relevant amount of time to better tailor threshold amount of time relevancy with respect to a user's travel history. For example, a user typically goes to a hospital for 30 minutes to chat with a friend who works there. Smart alert program 300 may determine that this is not a relevant threshold amount of time spent at a hospital. Smart alert program 300, via pattern recognition techniques, may determine that the threshold amount of time for the user is greater than 30 minutes.

Having determined the threshold amount of time relevant to the location category, smart alert program 300 determines whether the user is continuously present at the location longer than the threshold amount of time relevant to the location category (decision step 312). The amount of time the user is continuously present at the present location can be determined by location monitoring. Mobile phone localization, from either multilateration of radio signals between cell towers or by GPS, can pair a device to a location and a time. GPS provides geolocation and time information to a GPS receiver. Smart alert program 300 determines the amount of time continuously present at a location based on information provided by geolocation system 110 of FIG. 1. Smart alert program 300 calculates the amount of time continuously present at each specific geographic location from start to end from the time information provided to a GPS receiver of target device 104. For the case in which smart alert program determines that the user is present at location for shorter than or equal to the threshold amount of time relevant to the location category (step 312, "NO" branch), smart alert program 300 returns to step 304 to identify the location of the user at a later time (i.e., at a subsequent iteration of step 304).

For the case in which smart alert program 300 determines that the user is present at location for longer than the threshold amount of time relevant to the location category (step 312, "YES" branch), smart alert program 300 proceeds to send an alert and relevant information to the user's list of recipients (step 314). An alert may be a text message, automated phone call, and/or email to a desired recipient. The alert can contain information regarding the situation including one or more of the name of the user, the location of the user, information about the location, and the length of time the user was at the location. In an embodiment, smart alert program 300 may store, in database 220, a map of the locations the user's device was located at prior to the alert sent out. The recipient receives the map of locations the user has traveled at in the alert.

In an example, smart alert program 300 determines whether to send an alert while a user is travelling and resides at a location during the trip. Smart alert program 300 determines the location and the location category of the user while the user is travelling. Location categories, enumerated within a database or determined via pattern recognition techniques, can include locations on the trip such as roads, as well as commonly visited stopping locations, such as gas stations, rest stops, or restaurants. Smart alert program 300 determines locations not commonly visited, such as sides of roads away from buildings or attractions, as relevant. Smart alert program 300 sends an alert to the user's recipient list if user is present at the relevant location for longer than the relevant threshold amount of time. For example, user Abel is travelling on highway ABC when his car malfunctions, forcing Abel to pull over on the side of highway ABC. Smart alert program 300 determines the threshold relevant threshold amount of time for the side of a highway is 15 minutes. When Abel resides on the side of highway ABC for longer than 15 minutes, smart alert program 300 sends an alert to Abel's recipient list notifying them of a possible emergency. In another example, Abel is travelling on highway ABC when he stops at gas station DEF. Smart alert program 300 determines the relevant threshold amount of time for a gas station is 30 minutes. Abel stops at gas station DEF for less than 30 minutes. Smart alert program 300 does not send an alert to Abel's recipient list since Abel was not present at the gas station for longer than 30 minutes.

In an embodiment, before an alert is sent to designated recipients, smart alert program 300 notifies the user that an alert is about to be sent via target device 104. In this and similar embodiments, the user can advantageously disable the alert, snooze the alert (i.e., add time to the threshold time for the user while at the present location), or change the threshold amount of time relevant to the location category for any instance of the user being at a location that corresponds to the present location category. Smart alert program 300 may have a period of time for which the user must respond by or else the alert will be sent. For example, user Abel is visiting a friend at a hospital patient room in ABC Medical Center. Abel spends longer than one hour visiting his friend at the hospital patient room. Abel receives a text message from smart alert program 300 notifying him that an alert will be sent out to his designated recipients. Abel disables the alert so that smart alert program 300 does not send an alert out.

In another embodiment, smart alert program 300 determines whether to send an alert on the safe arrival by a user to a destination. Smart alert program 300 determines the relevant threshold amount of time based on a desired destination location. If a user resides in a desired location for a predetermined threshold amount of time, smart alert program 300 sends an alert to desired recipients. In an example, Baker is traveling by himself on a bus from bus stop ABC to bus stop DEF. Charlie, Baker's guardian, expects Baker to arrive at bus stop DEF at a specific time. The relevant threshold amount of time for bus stop DEF is 5 minutes. If Baker arrives at bus stop DEF and resides in the location of bus stop DEF for longer than five minutes, smart alert program 300 sends an alert to Charlie notifying them of Baker's arrival at bus stop DEF. In another example, Baker stays on the bus and passes by bus stop DEF. Smart alert program 300 determines that Baker resided at bus stop DEF for 30 seconds, since Baker remained on the bus which drove through bus stop DEF. Since Baker did not reside at bus stop DEF for longer than five minutes, no alert is sent to Charlie.

Figure 4:
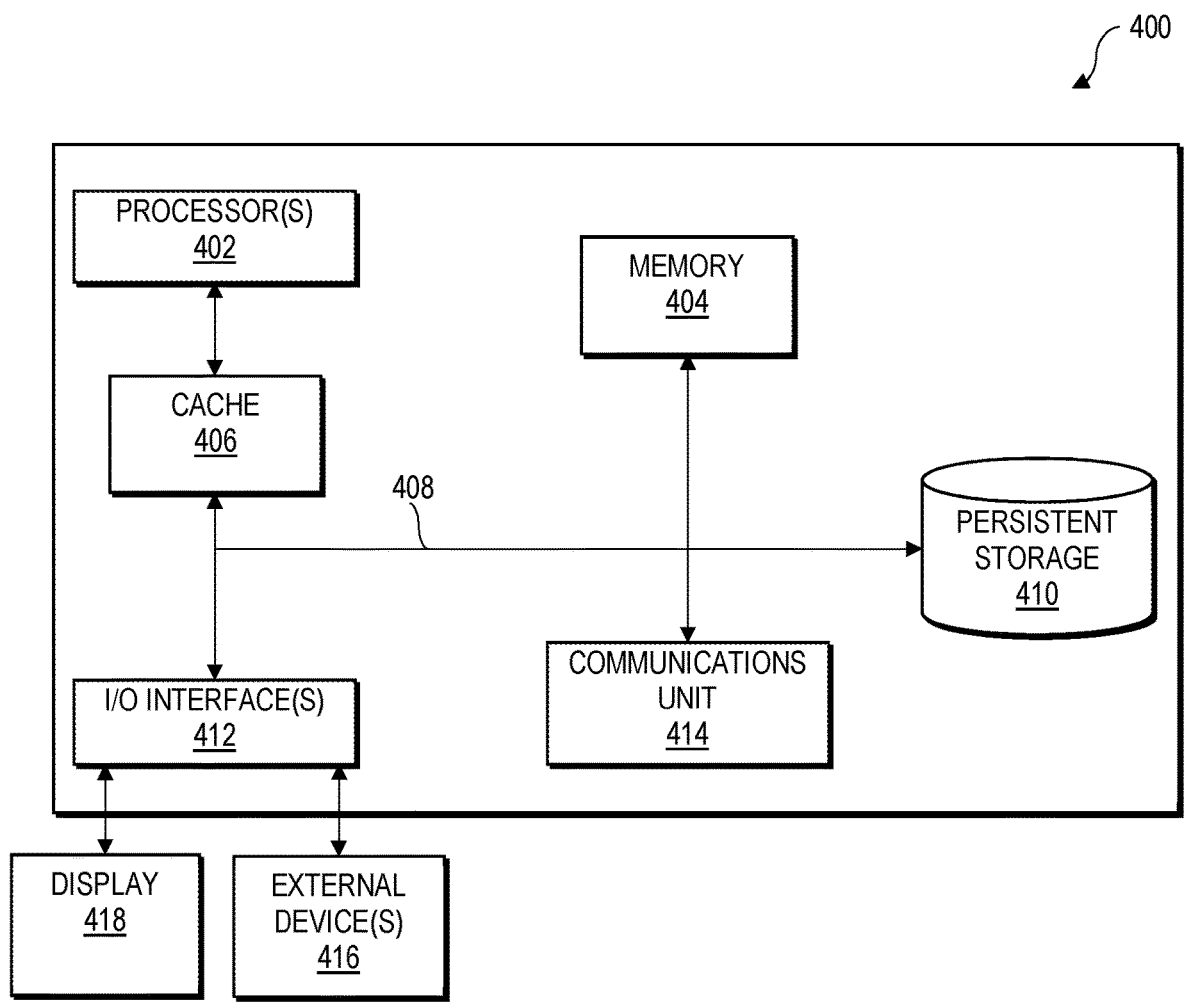
FIG. 4 is a block diagram of components of a computing device executing operations for sending an alert based on a user's location, in accordance with an embodiment of the present invention.

FIG. 4 is a block diagram of components of a computing device, generally designated 400, in accordance with an embodiment of the present invention. In one embodiment, computing system 400 is representative of smart alert server 112 within computing environment 100 and/or computing environment 200, in which case smart alert server 112 includes smart alert program 300.

It should be appreciated that FIG. 4 provides only an illustration of one implementation and does not imply any limitations with regard to the environments in which different embodiments may be implemented. Many modifications to the depicted environment may be made.

Computing system 400 includes processor(s) 402, cache 406, memory 404, persistent storage 410, input/output (I/O) interface(s) 412, communications unit 414, and communications fabric 408. Communications fabric 408 provides communications between cache 406, memory 404, persistent storage 410, communications unit 414, and input/output (I/O) interface(s) 412. Communications fabric 408 can be implemented with any architecture designed for passing data and/or control information between processors (such as microprocessors, communications and network processors, etc.), system memory, peripheral devices, and any other hardware components within a system. For example, communications fabric 408 can be implemented with one or more buses or a crossbar switch.

Memory 404 and persistent storage 410 are computer readable storage media. In this embodiment, memory 404 includes random access memory (RAM). In general, memory 404 can include any suitable volatile or non-volatile computer readable storage media. Cache 406 is a fast memory that enhances the performance of processor(s) 402 by holding recently accessed data, and data near recently accessed data, from memory 404.

Program instructions and data used to practice embodiments of the present invention may be stored in persistent storage 410 and in memory 404 for execution by one or more of the respective processor(s) 402 via cache 406. In an embodiment, persistent storage 410 includes a magnetic hard disk drive. Alternatively, or in addition to a magnetic hard disk drive, persistent storage 410 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 410 may also be removable. For example, a removable hard drive may be used for persistent storage 410. Other examples include optical and magnetic disks, thumb drives, and smart cards that are inserted into a drive for transfer onto another computer readable storage medium that is also part of persistent storage 410.

Communications unit 414, in these examples, provides for communications with other data processing systems or devices. In these examples, communications unit 414 includes one or more network interface cards. Communications unit 414 may provide communications through the use of either or both physical and wireless communications links. Program instructions and data used to practice embodiments of the present invention may be downloaded to persistent storage 410 through communications unit 414.

I/O interface(s) 412 allows for input and output of data with other devices that may be connected to computer system 400. For example, I/O interface(s) 412 may provide a connection to external device(s) 416 such as a keyboard, keypad, a touch screen, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 410 via I/O interface(s) 412. I/O interface(s) 412 also connect to display 418.

Display 418 provides a mechanism to display or present data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, a list of alternatives such as "at least one of A, B, and C" should be interpreted to mean "at least one A, at least one B, at least one C, or any combination of A, B, and C."

Additionally, the phrase "based on" should be interpreted to mean "based, at least in part, on."

The term "exemplary" means of or relating to an example and should not be construed to indicate that any particular embodiment is preferred relative to any other embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:
1. A method comprising:
    identifying a first GPS position of a user having a target device within a first location based, at least in part, on data provided by one or more geolocation systems, the first location being a building visited by the user;
    identifying a location category representing a function of the building;

determining the identified location category is among a predetermined set of location categories, wherein the predetermined set of location categories are relevant to an alert condition;
identifying a time threshold for the alert condition of the identified location category;
monitoring GPS positions of the user including the first GPS position while the user is within the first location;
determining an amount of time that the user is continuously present within the first location; and
responsive to determining the amount of time exceeds the time threshold sending an alert to one or more recipient devices to report the GPS position and the identified location category of the target device.

2. The method of claim 1, further comprising:
generating a list including the one or more recipient devices, wherein the user identifies the one or more recipient devices; and
storing the list of the one or more recipient devices in a database.

3. The method of claim 1, further comprising:
detecting, by the target device, a signal from a location beacon at a second location, wherein the second location is a predefined location within the first location, and wherein the location beacon emits a signal that identifies he one location the second location;
determining a second GPS position of the user when the signal is detected; and
assigning a current position of the user as the position of the target device from the first location to the second location within the first location based, at least in part, on the signal emitted by the location beacon and the second GPS position.

4. The method of claim 1, wherein the data provided by the one or more geolocation systems is provided by a first location beacon emitting a signal identifying the first location.

5. The method of claim 1, wherein the one or more geolocation systems consist of a global positioning system, one or more location beacons, optical character recognition computer program instructions, and natural language processing computer program instructions.

6. A computer program product comprising:
a computer readable storage medium and program instructions stored on the computer readable storage medium, the program instructions comprising:
program instructions to identify a first GPS position of a user having a target device within a first location based, at least in part, on data provided by one or more geolocation systems, the first location being a building visited by the user;
program instructions to identify a location category representing a function of the building;
program instructions to determine the identified location category is among a predetermined set of location categories, wherein the predetermined set of location categories are relevant to an alert condition;
program instructions to identify a time threshold for the alert condition of the identified location category;
program instructions to monitor GPS positions of the user including the first GPS position while the user is within the first location;
program instructions to determine an amount of time that the user is continuously present within the first location; and
program instructions to, responsive to determining the amount of time exceeds the time threshold send an alert to one or more recipient devices to report the GPS position and the identified location category of the target device.

7. The computer program product of claim 6, further comprising:
program instructions to detect, by the target device, a signal from a location beacon at a second location, wherein the second location is a predefined location within the first location, and wherein the location beacon emits a signal that identifies the second location;
program instructions to determine a second GPS position of the user when the signal is detected; and
program instructions to assign a current position of the user as the second location within the first location based, at least in part, on the signal emitted by the location beacon and the second GPS position.

8. The computer program product of claim 6, further comprising:
program instructions to generate a list including the one or more recipient devices, wherein the user identifies the one or more recipient devices; and
program instructions to store the list of the one or more recipient devices in a database.

9. The computer program product of claim 6, wherein the data provided by the one or more geolocation systems is provided by a first location beacon emitting a signal identifying the first location.

10. The computer program product of claim 6, wherein the one or more geolocation systems consist of a global positioning system, one or more location beacons, optical character recognition computer program instructions, and natural language processing computer program instructions.

11. A computer system comprising:
one or more computer processors;
one or more computer readable storage media;
program instructions stored on the one or more computer readable storage media for execution by at least one of the one or more processors, the program instructions comprising:
program instructions to identify a first GPS position of a user having a target device within a first location based, at least in part, on data provided by one or more geolocation systems, the first location being a building visited by the user;
program instructions to identify a location category representing a function of the building;
program instructions to determine the identified location category is among a predetermined set of location categories, wherein the predetermined set of location categories are relevant to an alert condition;
program instructions to identify a time threshold for the alert condition of the identified location category;
program instructions to monitor GPS positions of the user including the first GPS position while the user is within the first location;
program instructions to determine an amount of time that the user is continuously present within the first location; and
program instructions to, responsive to determining the amount of time exceeds the time threshold send an alert to one or more recipient devices to report the GPS position and the identified location category of the target device.

12. The computer system of claim 11, further comprising:
program instructions to detect, by the target device, a signal from a location beacon at a second location, wherein the second location is a predefined location within the first location, and wherein the location beacon emits a signal that identifies the second location;

program instructions to determine a second GPS position of the user when the signal is detected; and program instructions to assign a current position of the user as the second location within the first location based, at least in part, on the signal emitted by the location beacon and the second GPS position.

13. The computer system of claim 11, further comprising:

program instructions to generate a list including the one or more recipient devices, wherein the user identifies the one or more recipient devices; and program instructions to store the list of the one or more recipient devices in a database.

14. The computer system of claim 11, wherein the data provided by the one or more geolocation systems is provided by a first location beacon emitting a signal identifying the first location.

15. The computer system of claim 11, wherein the one or more geolocation systems consist of a global positioning system, one or more location beacons, optical character recognition computer program instructions, and natural language processing computer program instructions.

\* \* \* \* \*